US008209718B2

(12) United States Patent
Sharkey

(10) Patent No.: US 8,209,718 B2
(45) Date of Patent: Jun. 26, 2012

(54) METHOD AND SYSTEM FOR POSITIONING ROW ADVERTISING IN A PROGRAM GUIDE

(75) Inventor: Jeffrey L. Sharkey, Hermosa Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 663 days.

(21) Appl. No.: 11/828,500

(22) Filed: Jul. 26, 2007

(65) Prior Publication Data

US 2009/0031338 A1 Jan. 29, 2009

(51) Int. Cl.
*H04N 5/445* (2011.01)

(52) U.S. Cl. ........................................................ 725/42

(58) Field of Classification Search .................. None
See application file for complete search history.

(56) References Cited

U.S. PATENT DOCUMENTS

| | | | |
|---|---|---|---|
| 5,850,218 A | 12/1998 | LaJoie et al. | |
| 5,920,700 A | 7/1999 | Gordon et al. | |
| 6,357,043 B1 | 3/2002 | Ellis et al. | |
| 6,515,680 B1 | 2/2003 | Hendricks et al. | |
| 6,681,395 B1 | 1/2004 | Nishi | |
| 6,983,478 B1 | 1/2006 | Grauch et al. | |
| 7,634,789 B2 | 12/2009 | Gerba et al. | |
| 2002/0023021 A1* | 2/2002 | De Souza | 705/26 |
| 2002/0049980 A1* | 4/2002 | Hoang | 725/91 |
| 2002/0073424 A1* | 6/2002 | Ward et al. | 725/42 |
| 2002/0087970 A1* | 7/2002 | Dorricott et al. | 725/22 |
| 2002/0124182 A1* | 9/2002 | Bacso et al. | 713/200 |
| 2002/0138834 A1* | 9/2002 | Gerba et al. | 725/42 |
| 2002/0143791 A1* | 10/2002 | Levanon et al. | 707/200 |
| 2002/0143976 A1 | 10/2002 | Barker et al. | |
| 2002/0171686 A1* | 11/2002 | Kamen et al. | 345/850 |
| 2003/0009758 A1 | 1/2003 | Townsend et al. | |
| 2003/0084449 A1 | 5/2003 | Chane et al. | |
| 2003/0097661 A1* | 5/2003 | Li et al. | 725/109 |
| 2003/0115601 A1 | 6/2003 | Palazzo et al. | |
| 2003/0126595 A1* | 7/2003 | Sie et al. | 725/29 |
| 2003/0177495 A1 | 9/2003 | Needham et al. | |
| 2003/0229900 A1* | 12/2003 | Reisman | 725/87 |
| 2004/0006768 A1 | 1/2004 | Deshpande et al. | |
| 2004/0133923 A1* | 7/2004 | Watson et al. | 725/134 |
| 2004/0148638 A1 | 7/2004 | Weisman et al. | |
| 2004/0237114 A1* | 11/2004 | Drazin | 725/105 |
| 2004/0261098 A1 | 12/2004 | Macrae et al. | |
| 2005/0014463 A1 | 1/2005 | Shin | |
| 2005/0160458 A1 | 7/2005 | Baumgartner | |
| 2005/0193425 A1 | 9/2005 | Sull et al. | |
| 2005/0278760 A1 | 12/2005 | Dewar et al. | |

(Continued)

OTHER PUBLICATIONS

Non-final Office action dated Jun. 29, 2010 in U.S. Appl. No. 11/828,503, filed Jul. 26, 2007 by Deanna R. Kidd et al.

(Continued)

*Primary Examiner* — Joseph P Hirl
*Assistant Examiner* — An Nguyen

(57) ABSTRACT

A method of arranging row ads system within a program guide includes communicating row ad metadata to a user device and communicating program guide information to a user device. The program guide information defines a plurality of rows, wherein at least a first row is associated with a first channel. The method includes associating positioning information with the row ad relative to the first row, populating a second row from the plurality of rows in response to the metadata and displaying the row ad and displaying the first row associated with the first channel within a program guide structure on a display associated with the user device in response to the positioning information.

5 Claims, 9 Drawing Sheets

U.S. PATENT DOCUMENTS

| | | |
|---|---|---|
| 2006/0101496 A1 | 5/2006 | Syed |
| 2006/0116926 A1* | 6/2006 | Chen ............................ 705/14 |
| 2006/0129458 A1 | 6/2006 | Maggio |
| 2006/0183547 A1* | 8/2006 | McMonigle .................... 463/40 |
| 2006/0184989 A1 | 8/2006 | Slothouber |
| 2006/0242683 A1* | 10/2006 | Medford et al. ............. 725/139 |
| 2006/0271973 A1 | 11/2006 | Jerding et al. |
| 2007/0053513 A1* | 3/2007 | Hoffberg ...................... 380/201 |
| 2007/0107014 A1 | 5/2007 | Howard et al. |
| 2007/0186230 A1 | 8/2007 | Foroutan |
| 2007/0250901 A1 | 10/2007 | McIntire et al. |
| 2007/0288963 A1 | 12/2007 | Ahmad-Taylor et al. |
| 2008/0022298 A1 | 1/2008 | Cavicchia |
| 2008/0098450 A1 | 4/2008 | Wu et al. |
| 2008/0155628 A1 | 6/2008 | Soukup et al. |

OTHER PUBLICATIONS

Non-final Office action dated Dec. 22, 2010 in U.S. Appl. No. 11/828,503, filed Jul. 26, 2007 by Deanna R. Kidd et al.

Non-final Office action dated Jun. 15, 2011 in U.S. Appl. No. 11/828,503, filed Jul. 26, 2007 by Deanna R. Kidd et al.

Final Rejection dated Jan. 5, 2012 in U.S. Appl. No. 11/828,503, filed Jul. 26, 2007 by Deanna R. Kidd et al.

* cited by examiner

METHOD AND SYSTEM FOR POSITIONING ROW ADVERTISING IN A PROGRAM GUIDE

TECHNICAL FIELD

The present disclosure relates to a content processing and delivery system and, more specifically, to a system for forming and displaying programming guide structures.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

Content providers are increasingly trying to determine additional ways to provide content to users. Communicating the availability of various content available within the system may ultimately increase customer awareness and use of the system.

SUMMARY

The present disclosure sets forth various ways to position advertising in a guide structure to conveniently notify users of various programming opportunities and link the users to various information.

In one aspect of the disclosure, a method includes communicating row ad metadata to a user device and communicating program guide information to a user device. The program guide information defines a plurality of rows, wherein at least a first row is associated with a first channel. The method further includes associating positioning information with the row ad relative to the first row, populating a second row from the plurality of rows in response to the metadata and displaying the row ad and the first row associated with the first channel within a program guide structure on a display associated with the user device in response to the positioning information.

In another aspect of the invention, a method includes communicating row ad metadata to a user device and communicating program guide information to a user device. The program guide information defines a plurality of rows, wherein at least a first row is associated with a first channel and a second row is associated with a second channel. The method also includes associating positioning information with the row ad relative to the first row, populating a third row from the plurality of rows in response to the metadata and displaying the row ad in the third row and displaying the first row associated with the first channel within a program guide structure on a display associated with the user device in response to the positioning information when the second row is present.

In yet another aspect of the invention, a method includes communicating row ad metadata to a user device and communicating program guide information to a user device. The program guide information defines a plurality of rows, wherein at least a first row is associated with a first channel and a second row is associated with a second channel. The method also includes associating positioning information with the row ad relative to the first row, populating a third row from the plurality of rows in response to the metadata and displaying the row ad in the third row and displaying the first row associated with the first channel within a program guide structure on a display associated with the user device in response to the positioning information when the second row is absent.

In a further aspect of the disclosure, a method includes designating a channel as a row ad anchor associated with a first row and displaying the row ad over the first row when a date for row ad availability is passed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
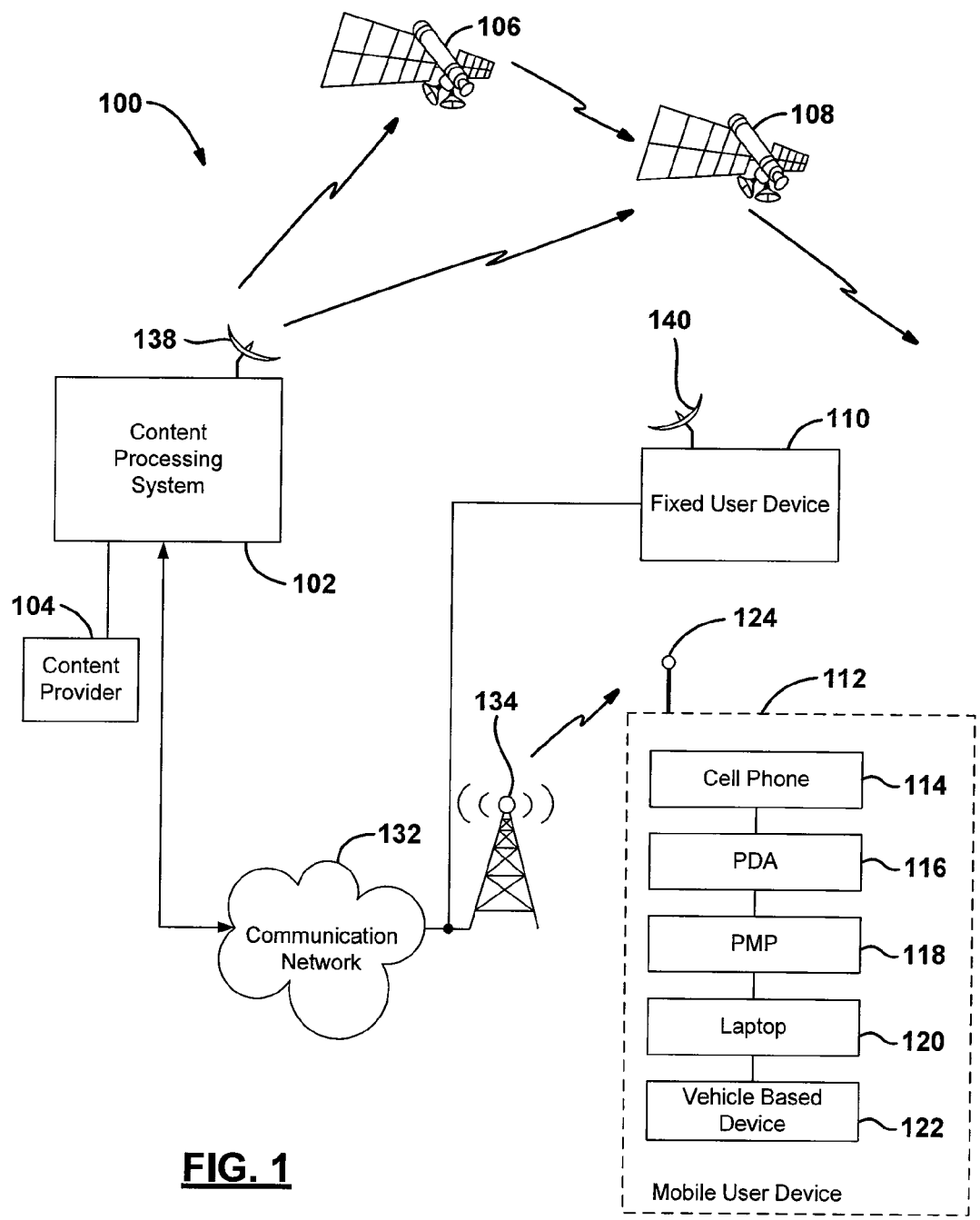
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a terrestrial system such as cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (ERDs) or set-top box. Wireless communications are exchanged between the content processing system 102 and the fixed user devices 110 through one or more of the satellites 106, 108. The wireless communications may take place at any suitable frequency, such as, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Information or content provided to content processing system 102 from the media source 104 may be transmitted, for example, via an uplink antenna 138 to the satellite(s) 106,108, one or more of which may be a geosynchronous or geostationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset can be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the IRD 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
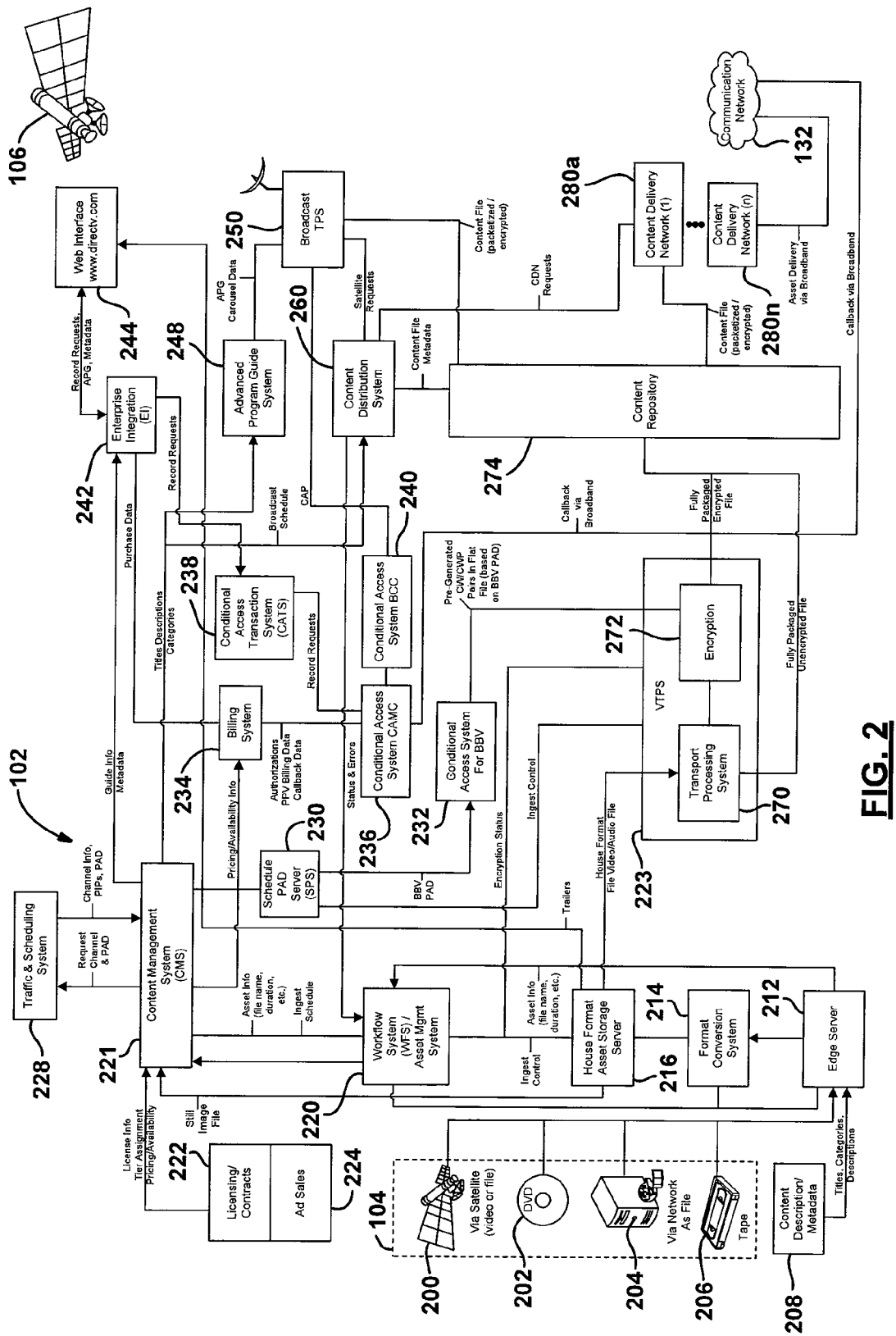
FIG. 2 is a detailed block diagrammatic view of the content processing system of FIG. 1.

Referring now to FIG. 2, the content processing system 102 of FIG. 1 is illustrated in further detail. The content provider 104 may include various types of content providers, including those that provide content by way of a satellite 200, DVD 202, via a network as a file in 204, by way of tapes and other means. The content provider 104 may also provide graphics, content description, and other metadata 208 to the system.

The content providers 104 may be various types of content providers and provide various types of content including advertising content such as row advertising (ads) is further described below. The content providers may provide various types of information including advertising information. Advertising providers may provide information on various products or various available or future content. It should be noted that the advertising provider and the content provider may be one and the same.

Information as to row ads may be provided by a content provider or an advertising provider. The row ads are ads that form a row or can take up a row or partial row in the program guide. Positioning information for positioning the row ad relative to a channel row may also be provided in the row ad information or metadata. Visibility information may also be provided regarding the row ad. For example, a row ad may be visible or hidden depending on the presence or absence of a particular channel. Information received from the various providers may include various types of metadata, graphics, and the like. The metadata may also include location data as to where the row ad may fit as well as links to posters, asset or material identifications and various other links. Links provide a path to various other information. Links may also cause an action to be performed, such as tuning to a particular channel. The specifics of this will be described below.

The row ad metadata may include provider information that includes an identifier for identifying the content provided from the provider. A product identifier may also be included in the row ad metadata. An asset name stream may also be used to identify the asset. Major version numbers and minor version numbers may also be provided for the row ad content. A short description of the content may also be provided in the metadata. The creation date identifying the creation date of the content or row ad may also be provided in the metadata. A provider ID may also be formed. The provider ID may be various types of identification, including an internet domain name. An asset ID may be provided by the provider to identify the asset. A unique portable or material identification of the asset may be a combination of the provider ID and the asset identification. The material ID will be further described below in reference to the content management system which uses the material identification for various assets, including row ads. An asset class may also be assigned to the system. A verb may also be formed in the metadata. Verbs may include commands such as empty string and delete. An availability dates corresponding to a starting and ending date or time the row ad should be displayed.

A link type may also be provided in the metadata that is used to identify a title of the asset, a channel or a home page to which the row ad will link. The link type will also be described further below.

A link asset ID may also be included in the metadata. The link asset ID identifies the link from the row ad to the asset ID of the title asset. If the link is to a channel or home page, this metadata may not be included.

Rollover text metadata may also be included in the system. The rollover text may appear when the particular row ad is highlighted by the user device. This string may include a phrase or other textual communication.

A text-only ad field may also be included in the metadata. A text-only ad includes merely a string of characters to be displayed. A text-only ad font may be used to change the font of the text-only ad. Various types of fonts, such as those commonly available in word processors, may be used. This may give the row ad a different look than the remaining portions of the program guide.

Content providers may also have a home page within the present system. Briefly, the home page is a portion of the program guide for selecting content to be downloaded to the user device. The system operator may also have its own home page that has various categories of content. The categories and types of home pages will be described below.

The home page may be formed in various configurations including a menu structure. The content providers may also provide various metadata for the menu structure or program guide.

Each provider may also have a home page within the system from which a user device may be used to select and navigate through the menu. Ultimately, a selection may be made and communicated from the user device back to the content distribution network (CDN), whereby the CDN provides the content to the user device. Content metadata used for identification may also be provided relative to the home page, and link the content to one or more home pages. The provider, product, asset name, version major, version minor, description, creation date, provider ID, asset ID, asset class and verb, as described above with respect to the row ad, may also be provided in the home page metadata. In addition, a home page construction type may be provided in the metadata. For example, the home construction type may use the wording "complete" to refer to images of posters, background and other information. The string "background" may only provide a particular background scene upon which graphics and other data is placed. The background and various aspects of the home page will be described below.

The metadata for the home page may also include a home construct template that represents a template number that may be filled in by the various content providers. The operator of the content processing system may establish various home page templates for which various information may be provided by the content providers to fill in the home page. Various categories and the like may be filled in by the content providers within the various parameters of the various templates. This portion of the metadata may be used to identify the pre-made templates.

A poster art position metadata may also be provided by the content provider. Various poster positions, as will be described below, may be established by the content processing system. As will be described below, the posters may be used in a "complete" home page construction type. The poster position identifies the poster art position and may include a variable to identify the template number and a number to identify the template and a number to identify the poster position.

A poster art position tab text may identify a tab text associated with the poster art position. One number associated with this metadata may include the template number and another number may identify the poster position. The value may be a string that is displayed at a certain position somewhere around or underneath the poster.

A promotional (promo) area title may also be included in the metadata. The promotion area title may specify the title to be shown in the promo area of the home page. The promotional area may be an area defined within the template. This may also be set forth only in a complete.

The promotional area body may provide certain amount of characters or lines below the title in the promotional area of the home page. There may be one or several promotional areas within a home page.

A home page display start and a display end metadata field may also be provided. This may provide a start time and end time for displaying the fields. The start time and end time may correspond to the local time of the particular user device. That is, based upon the display start time and display end time and the local clock, the display may be changed accordingly.

Another area of the content processing system 102 is an input server 212 that receives the various content and converts the format in a format conversion system 214. A house format asset storage server 216 may be used to store the content asset in a house format. Still image files, trailers, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packets containing the content. The encoder may encode the data into various transport formats such as DIRECTV® proprietary formats, or industry standard formats. The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102. The content management 221 may also assign material identifications to the various received content. The material identification may utilize the asset identifier (ID) in the metadata as well as the provider ID. Content, posters and other received information may be assigned related material identifications to make them easier to associate and retrieve. For example, different suffixes may be used to identify related content with the remainder of the material identification being the same.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

The Content Management System (CMS) 221 in combination with the SPS (230) is used to provide the requested channel, program associated data (PAD), channel information and program information packets (PIPs). The CMS 221 may schedule content processing for a plurality of received assets based on a desired program lineup to be offered by the communication system 100. For example, a live TV program for which a high demand for reruns might be expected could be assigned a high priority for content processing.

A schedule PAD server (SPS) 230 may be coupled to the CMS and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 (of FIG. 1) are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Remote record requests may also be provided from the conditional access transaction system 238. A conditional access system BCC 240 may be used to generate a conditional access packet from the information from the conditional access system 236.

The billing system 234 may generate purchase data that is provided to the enterprise integration (EI) block 242. The enterprise integration block 242 may generate remote record requests to the conditional access transaction system 238. Remote record requests may be generated through a web interface such as DIRECTV.com® in block 244. Various ordering information, such as ordering broadband video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Titles, description, various categories and metadata from the content management system 221 may be provided to the advanced program guide system 248. The program guide system 248 may be coupled to a satellite broadcasting system such as a broadcast transport processing system 250 that broadcasts content to the users through the satellite 106, 108.

The program guide data generated by the program guide system 248 may include information that is used to generate a display of guide information to the user, wherein the program guide may be a grid guide and informs the user of particular programs that are broadcast on particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Content files may also be provided from the content management system 221 to the content distribution system 260.

Referring back to the video transport processing system 223, the video transport processing system 223 includes a transport packaging system 270. The transport processing system 270 creates pre-packetized unencrypted files. An encryption module 272 receives the output of the transport processing system and encrypts the packets. Fully packaged and encrypted files may also be stored in the content repository 274. Encryption may take place in the data portion of a packet and not the header portion.

One or more content delivery networks 280*a-n* may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280*a*-280*n*, collectively referred to as content delivery network 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hypertext transfer protocol (HTTP), etc. Each file received by the user device may be checked for completeness and integrity and if a file is not intact, missing, and/or damaged portions of the files may be delivered or downloaded again. Alternatively, the entire file may be purged from the user device 110 and delivered or downloaded again.

The broadcast transport processing system 250 may provide various functions, including packetizing, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, program guide information or asset files, menus structures etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

Figure 3:
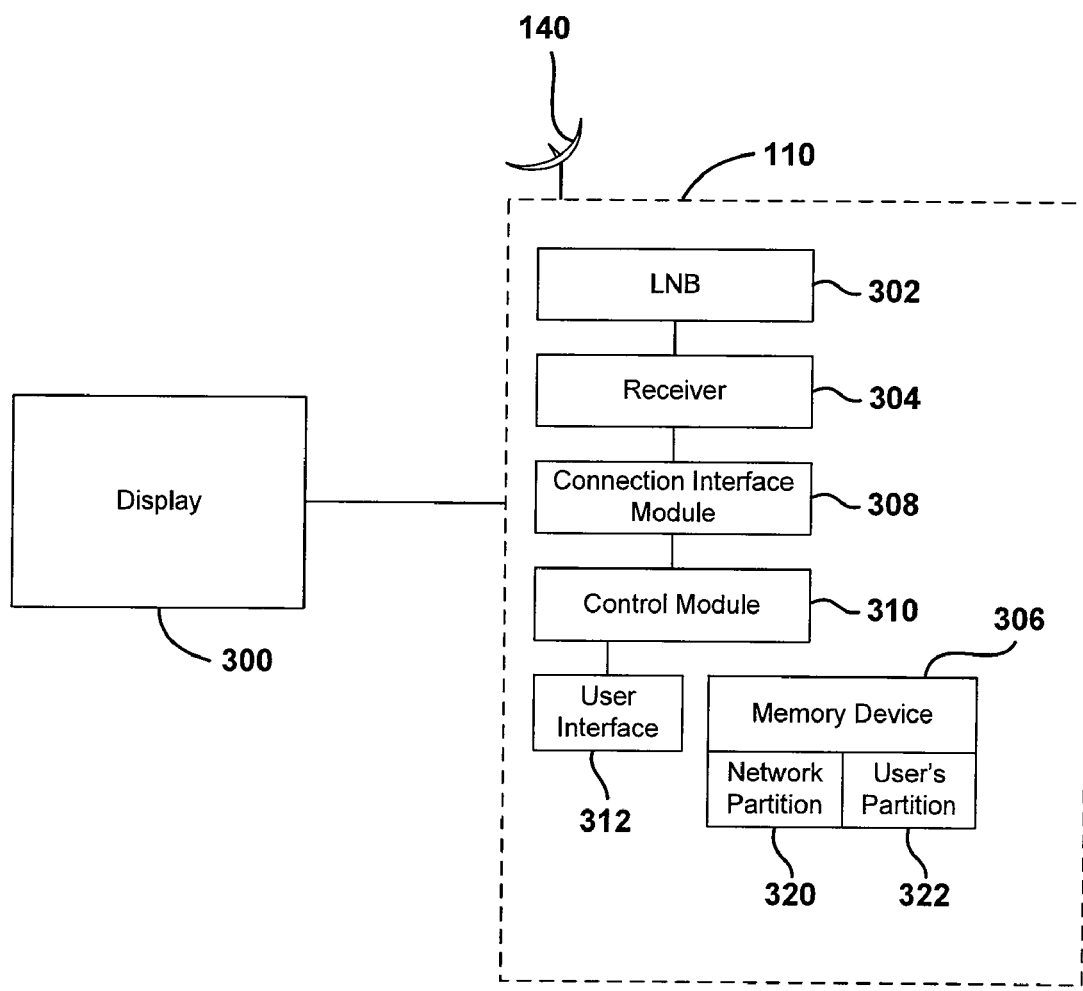
FIG. 3 is a detailed block diagrammatic view of the fixed user device of FIG. 1.

Referring now to FIG. 3, the user device 110 may be one of any variety of devices, for example, a set-top box, a home media server, a home media center (HMC), a personal computer (PC) having a receiver card installed therein, etc. A display device 300 such as a television set, a computer monitor, a portable media player or the like may be coupled to the user device. The user device 110 may be an integrated receiver decoder, a satellite television receiver or the like for displaying and/or playback of received programming.

The receive antenna 140 (124 on a mobile device) receives signals conveying a modulated multiplexed bitstream from the satellites 106, 108. Within the receive antenna 140, the signals are coupled from a reflector and feed to a low-noise block (LNB) 302, which amplifies and frequency downconverts the received signals. The LNB 302 output is then provided to a receiver 304, which receives, demodulates, depacketizes, demultiplexes, decrypts and decodes the received signal to provide audio and video signals to the display device 300 or a memory device 306, or both. The memory device 306 may be implemented separately from or within the user device 110. The receiver 304 is responsive to user inputs to, for example, tune to a particular program.

To store received and/or recorded programs and/or assets, the memory device 306 may include any of a variety of or combination of storage devices such as a hard disk drive, DVR, flash memory or other types of memory devices. The memory device 306 may be used to store the content, information, metadata, program guide objects and information and/or programs received via the satellites 106, 108 and/or the CDN 280. In particular, the packets stored on memory device 306 may be the same encoded and, optionally, encrypted packets created by the content processing system 102 and transmitted via the satellites 106, 108 and/or made available for download via the CDN 280.

The memory device 306 may also be a device capable of recording information on, for instance, analog media such as videotape or computer readable digital media such as a hard disk drive (HDD), a digital versatile disc (DVD), a compact disc (CD) and/or any other suitable media.

To communicate with any of a variety of clients, media players, etc., the illustrated example the user device 110 includes one or more connection interface modules 308 (e.g., USB, serial port, Firewire, etc.). The connection interface module 306 may act as a network interface that implements, for example, an Ethernet interface.

Each user device 110 may connect to the communication network such as the Internet 122 via any of a variety of technologies, for instance, a voice-band and/or integrated services digital network (ISDN) modem connected to a conventional PSTN, a wireless broadband connection (e.g., IEEE 802.11b, 802.11g, etc.), a broadband wired connection (e.g., ADSL, cable modems, etc.), a wired Ethernet connection (e.g., local area network (LAN), wide area network (WAN), etc.), a leased transmission facility (e.g., a digital signal level 1 circuit (a.k.a. a DS1), a fractional-DS1, etc.), etc.

The user device 110 may also include a control module 310 that is used to control the operation of the various components within the user device.

A user interface 312 may, for example, be a set of push buttons or a remote control interface. The user interface 312 is used to make selections, input various data, and change the parameters of the user device 110. The user interface 312 may be used together with a graphical user interface displayed on the display device associated with the user device.

It should also be noted that the user devices 114 (device 110) may be configured in a similar manner to those illustrated in FIG. 3 through reference number 110. Such devices may include an internal antenna rather than an external dish-type antenna that is illustrated in the fixed device as 140. Also, external antennas are possible such as a phased array antenna.

The recording device 306 may also be partitioned into a network partition 320 and a user partition 322. Different types of content or assets may be stored in the network partition 320 or the user partition 322. The content stored in the different partitions may relate to the tier of the content. This will be further described below.

Figure 4:
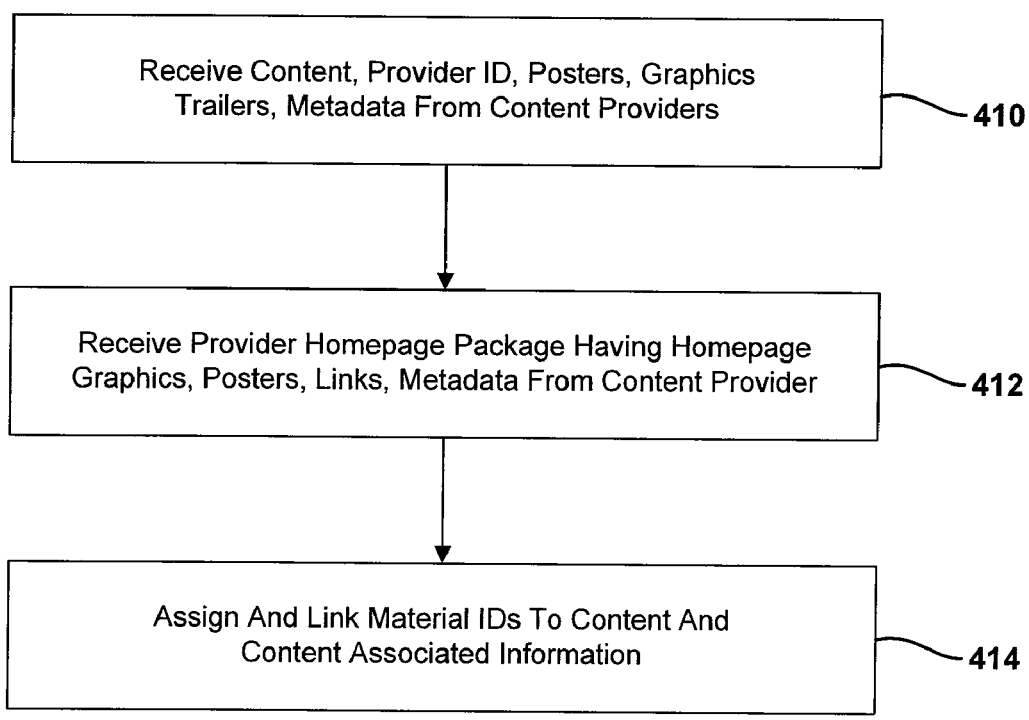
FIG. 4 is a flowchart illustrating a method for linking content and content-associated information.

Referring now to FIG. 4, a method of assigning material identifications to various content and content-associated information is set forth. This process may also be used for assigning information to row ads. In step 410, content is received from various content providers. The providers may provide a provider or asset identification (ID) for the content provided. Posters, trailers, graphics, metadata may also be received from content providers. The content and the other content-associated information may be received in different ways or the same way. When received in different ways, they may be associated together in the content processing system. In step 412, the content providers may also provide a home page package having the home page graphics, posters, links and metadata from the content provider. The types of metadata that may be received from the content providers were described above in FIG. 1.

In step 414, the material identification is assigned to the content and to the content-associated information. This step may be performed in the content management system of FIG. 2. Preferably the material ID and the associated content information are linked together. As mentioned above, one way to link the content with the content-associated information is to provide a common material identification with various suffixes to identify the various information.

Figure 5:
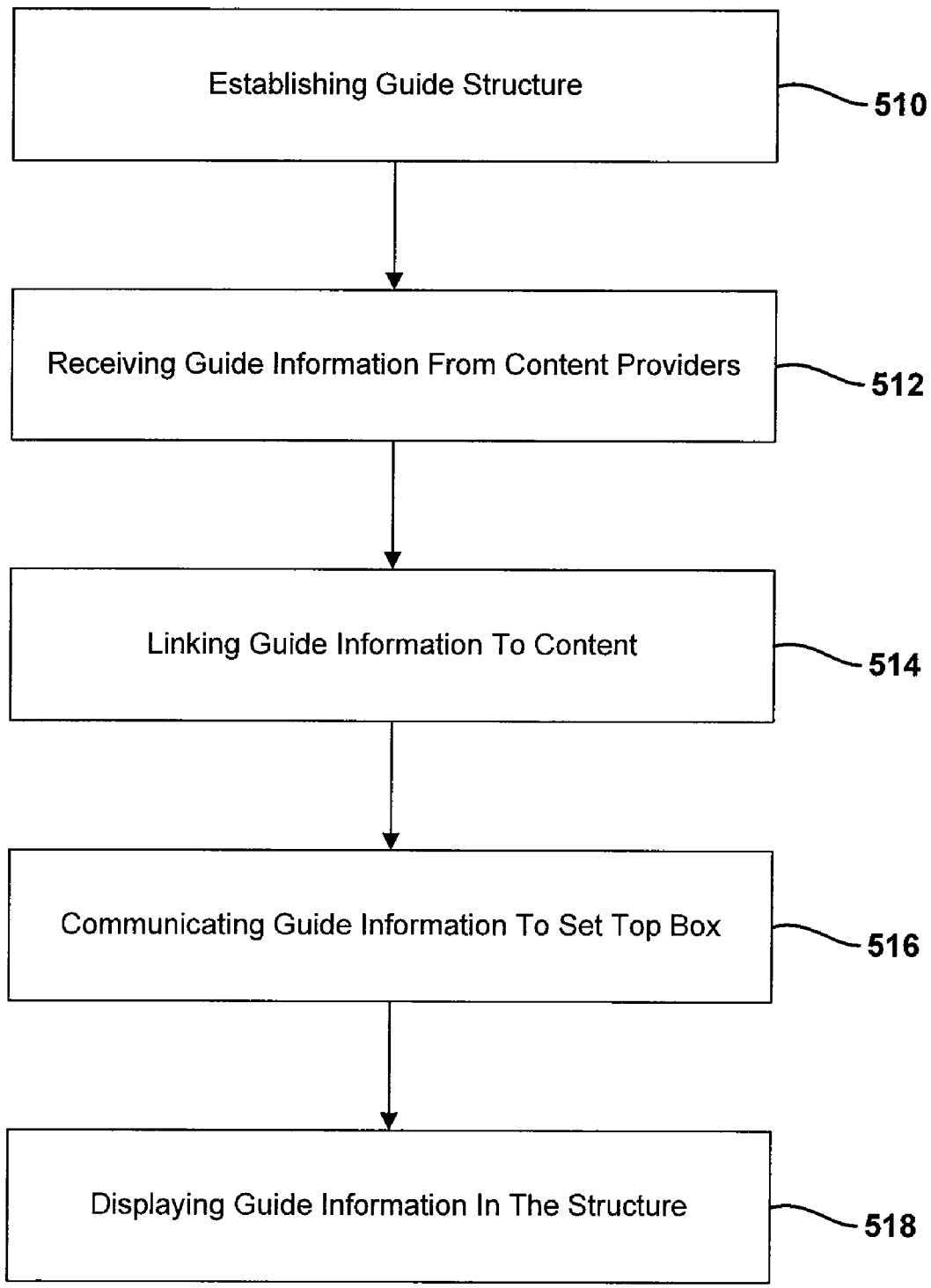
FIG. 5 is a flowchart of a method for establishing a guide structure.

Referring now to FIG. 5, the information received above may be used to populate a guide or menu structure. In step 510, the content processing system establishes various guide structures. These may be referred to as templates. The templates may correspond to the physical layout of the screen display on the user device. In step 512, the guide information is received from content providers. The guide information may be received in various manners as described above. In step 514, the guide information is linked to the content. In step 516, the guide information is communicated to the user device. The guide information may also be referred to as objects. The guide information may be program guide information or separate menus that are reachable from the program guide information. Guide information may be continuously broadcast at various times throughout the day so that the guide information may be updated. The guide information may be stored in the memory of the user device and displayed on request.

In step 518, the guide information is displayed in the associated structure using the particular template associated with the guide information. The guide information may also be in the form of a menu structure that also includes various templates. The guide information may be communicated in various ways, including through the terrestrial system, broadband communication system, satellite or the like. The content information may also include the metadata as described above. The metadata may provide various ratings and the like for the particular content.

Figure 6:
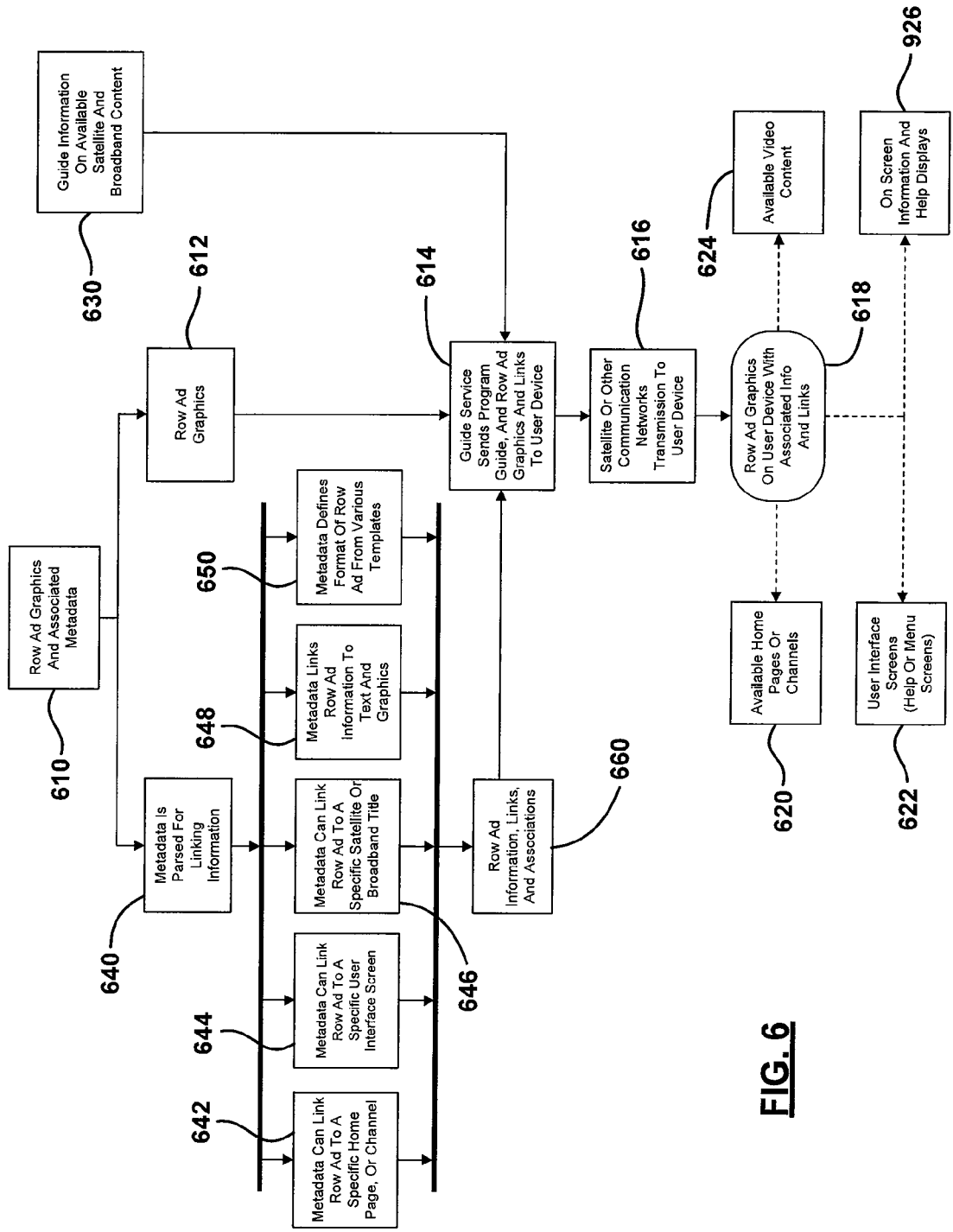
FIG. 6 is a flowchart of a method for processing row-ad graphics.

Referring now to FIG. 6, a method for processing row ads is set forth. In step 610, row-ad graphics and associated metadata that is described above may be received at the content processing system. In step 612, the row-ad graphics may be provided to the program guide service in step 614.

The row ad graphics may include various types of information as to the positioning of the row ads. Visibility information for the row ads may also be provided in the row ad graphics. The row ad graphics may include various types of functionality including a "stick to" functionality that allows the row ad to be displayed adjacent to a row associated with a channel. For example, the row ad may always be displayed above a particular row for an associated channel. The row ad may also be displayed directly below an associated channel. The associated channel may be referred to as an anchor channel. In certain situations, the row ad may also be displayed with an offset relative to its associated anchor channel row. An offset may be above, below, or directly over a particular channel.

The row ad graphics may also include metadata or information for always displaying a row ad above or below an anchor channel row. This may be useful when a particular channel is directly addressed by entering numbers on the keypad of the user interface, such as a remote control. Typically, when a numerical value is entered for a channel, that channel populates the top row of the visible portion of the program guide. A "stick to" function may force the row ad to the top of the grid guide and the directly-addressed channel row may be displayed directly below the row ad.

Visibility information or metadata may also be provided by the advertising provider, the content provider or associated at the system level. The system level refers to the operators of the content processing system such as DIRECTV®. The visibility information may be tied to an anchor channel for placement but has its visibility tied to another channel. For example, a row ad may be tied to Channel 100 for placement but its visibility may be tied to the presence of HBO® Channel 501. One example is that the row ad may be visible to promote a particular piece of content available on HBO®. Therefore, if the user is an HBO® subscriber, then the content of the row ad may be displayed. An alternative to this is the converse in which the row ad may display an invitation to join HBO® as a subscriber if the HBO® channels are not displayed, which indicates the user is not an HBO® subscriber. User devices that are subscribed to HBO® will not display such row ads.

There may be other conditions in which a channel may be used solely for anchoring a row ad. The channel will not be visible until the row ad is available to the user device based upon the availability dates.

The row ad graphics may also contain conditional expressions such as basing the visibility or non-visibility based upon the user device characteristics. For example, the presence or absence of an ATSC tuner, the presence of an Internet connection, whether the device has a DVR. Other conditional information may include a service ID such as whether or not a premium package is subscribed to, local channels are subscribed to, or the like. Other conditional information may include region bits such as the designated marketing area in which a subscriber resides.

The program guide service may send the guide information, row-ad graphics and links to the set top box or other user device. In step 616, the satellite or other communication transmits the information to the user device or the set top box. In step 618, the row-ad graphics are stored within the set top box and displayed with the associated links. Step 620 may be performed after step 618. In step 620, the available home pages or channels may be reached from the various row ads. After step 618, step 622 may also be performed which generates a user interface screen such as help screens or menu screens. The row ads may also link to available video content directly. That is, a material identification may be transmitted in response to selecting a row ad in step 624. In step 630, the guide information available on the satellite and broadband content may be communicated to the guide service in step 614 which then provides the information to the set top box through the satellite.

Referring back to step 610, metadata may also be received in step 610. Step 640 may be performed after step 610 for the metadata. The metadata may be parsed for linking information in much the same way as parsing was performed in step 852 of FIG. 8. After step 640, steps 642 through 650 may be performed. Some or all of steps 642 through 650 may be performed depending on the various metadata received.

In step 642, the metadata may be used to link row ads to a specific home page or channel. By the user selecting the row ad, a direct link may be provided to the home page or channel. That is, the tuner may be directed to a specific channel or the user device may be directed to a specific menu or home page within the program guide or menu structure.

In step 644, the metadata may link the row ad to a specific user interface screen. In step 646, the metadata may be used to link the row ad to a specific satellite or broadband title. For example, a specific satellite may be used for various channels or various information. The tuner may thus be tuned to that specific satellite. By selecting a specific broadband title, material identification may be communicated back to the content processing system 102 of FIG. 1 and thus the content may be communicated to the user device.

In step 648, the metadata may link the row ad information to text and various graphics. The text and various graphics may be received at the user device and stored in a memory in association with or not in association with a program guide. The text may provide various information, such as a description of various content and/or various graphics and pictures associated with the content, or informational or help text.

In step 650, the metadata may define various formats of the row ad from various templates. The content processing system provider may establish various templates for providing the row ads. The templates may provide various positions, behavior, and areas for providing graphics selection buttons, and the like. As will be described below, the row ad may be placed above, below or spaced apart from an associated channel.

After steps 642 through 650, step 660 may be performed. In step 660, the row ad information links and associations are provided to the guide service of step 614. After step 614, steps 616 through 624 may be performed as described above.

Examples of various positions of row ads are set forth in the following figures.

Figure 7:
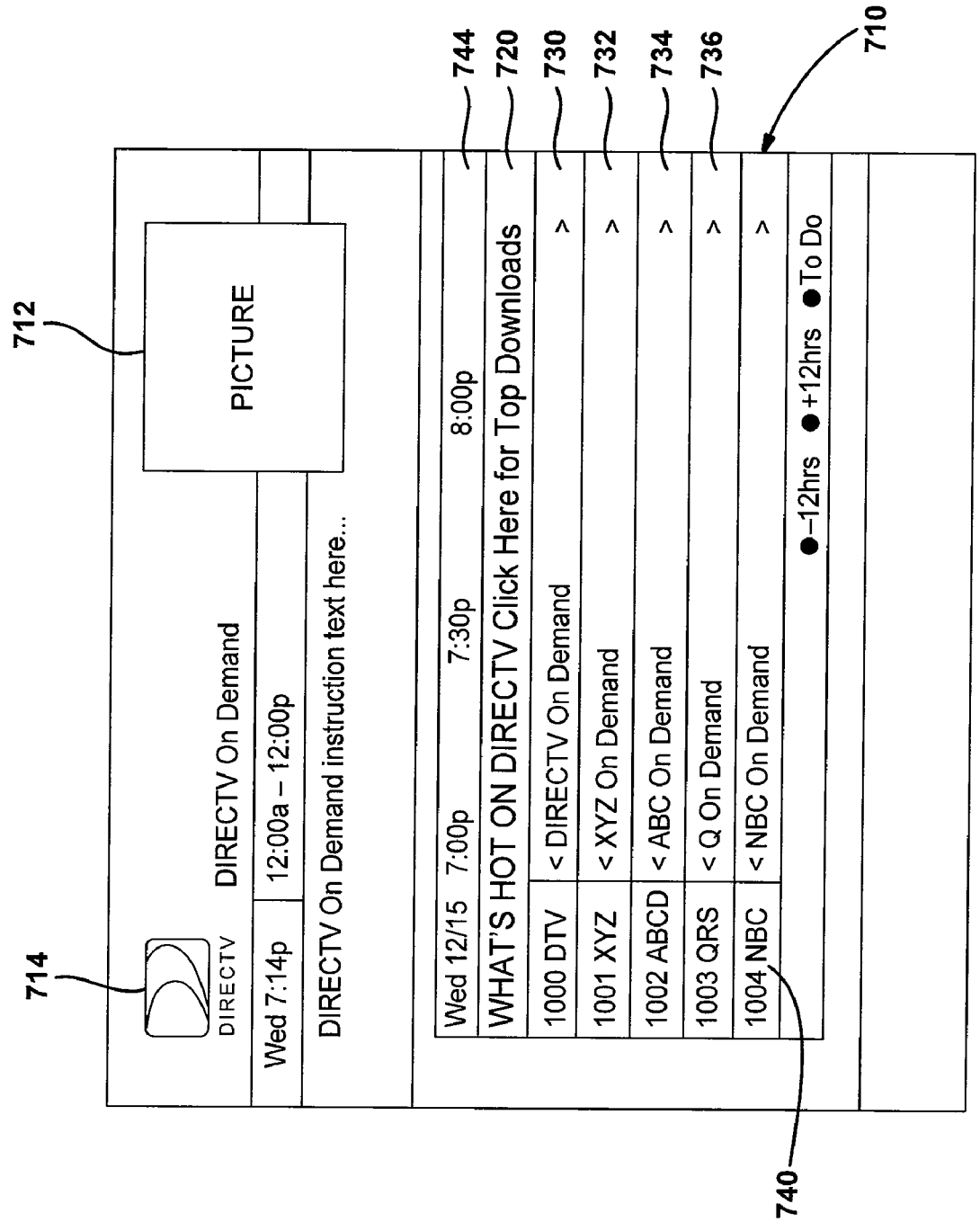
FIG. 7 is a schematic view of a screen shot illustrating a row ad placement according to several aspects the present disclosure.

Referring now to FIG. 7, an example of a program guide 710 is illustrated. The program guide 710 includes a preview or current-channel screen 712, a logo area 714 and a row ad 720. The row ad 720 may be selected by moving a cursor or other selection indicator with the user interface. The row ad 720 may take a particular form, including various types of graphics and various types of links that may be associated with the row ad. The links may directly be associated with a material ID for directly ordering the particular content. The links may also time the tuner to a particular linear or broadband channel. Further, various types of graphics, menu pages and menu structures may be associated with the row ad and may be selected when desired. Other rows 730, 732, 734, 736 and 740 may be used to generate the remaining portion of the program guide. Time and date information may be displayed in time ad 744. That is, the program objects received by the system may be used to generate the remaining program guide information. Row ads may be directed to appear at various positions. For example, row ads may be placed directly adjacent to a particular channel listing or a particular type of listing within the program guide. In this example, the row ad is placed directly above an anchor channel such as Channel 1000 DTV. The same type of screen display may be used when directly selecting Channel 1000. The row ad 720 may be directly tied to Channel 1000. That is, after directly selecting Channel 1000 on a remote device, the row ad appears above Channel 1000 with various other channel selections there below.

FIG. 7 also illustrates a "stick to" below function. For example, the visibility of the row ad may be tied to Channel 1000 while the row ad may be tied directly to the anchor channel of Channel 999. So when Channel 1000 is selected, the row ad associated with Channel 999 is displayed on the top row of the visible area of the program guide.

Figure 8:
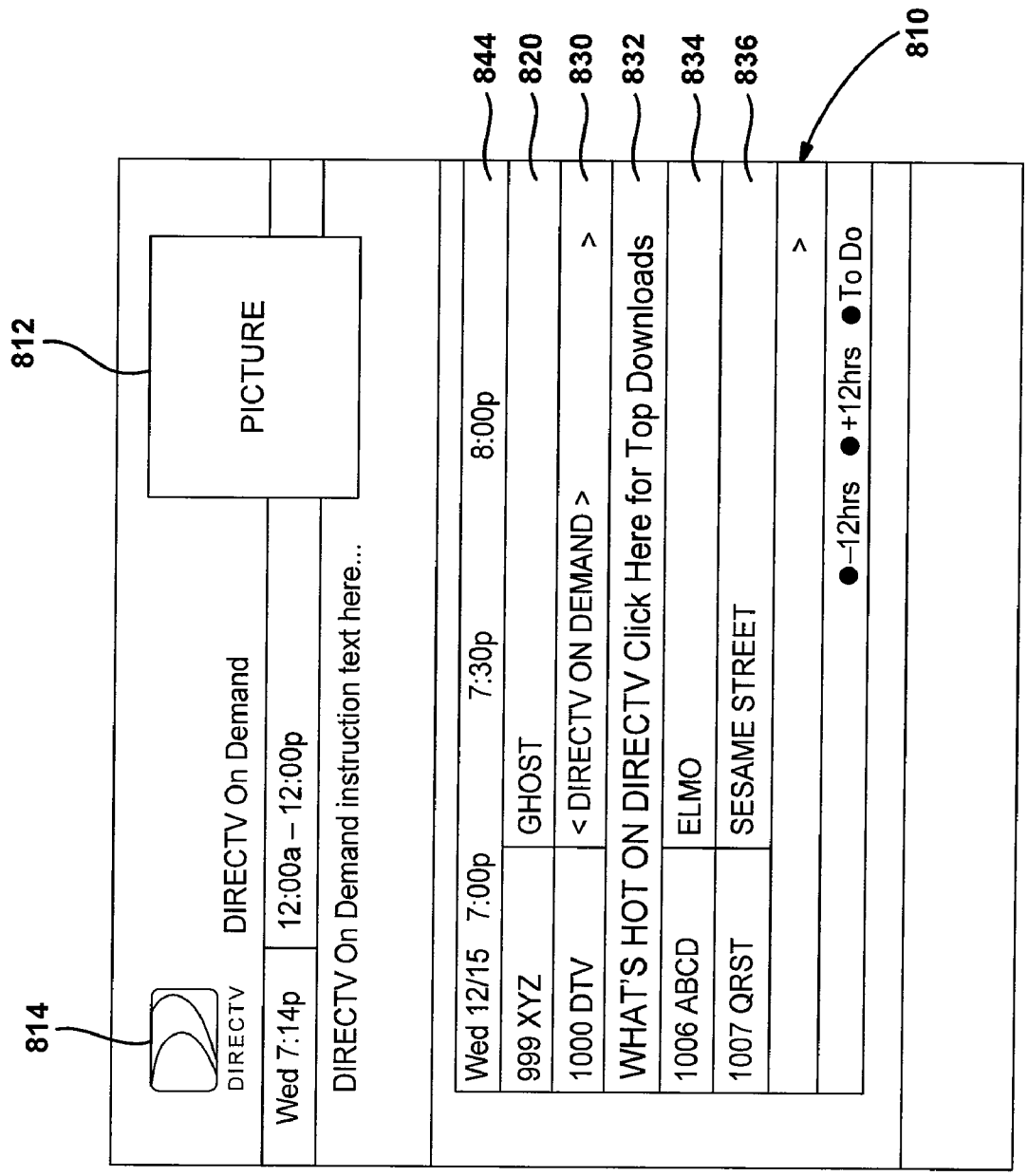
FIG. 8 is another schematic view of a screen shot illustrating a row ad placement according to other aspects the present disclosure.

Referring now to FIG. 8, a configuration similar to FIG. 7 is illustrated with reference numerals in the 800s. Screen display 810, preview area 812 and logo area 814 are illustrated. Changes from FIG. 7 include the position of the row ad 832. In this example, the row ad 832 is positioned directly below Channel 1000 DTV. Thus, Channel 1000 DTV is the anchor channel row 830. Other rows for other channels 820, 834 and 836 are also illustrated.

FIG. 8 also illustrated another condition. If the row ad is associated with Channel 1001, the visibility of the channel may be associated with the availability of the row ad. Thus, when the current date is between the row ad start and end dates (or availability window), Channel 1001 displaying the row ad is set forth.

Figure 9:
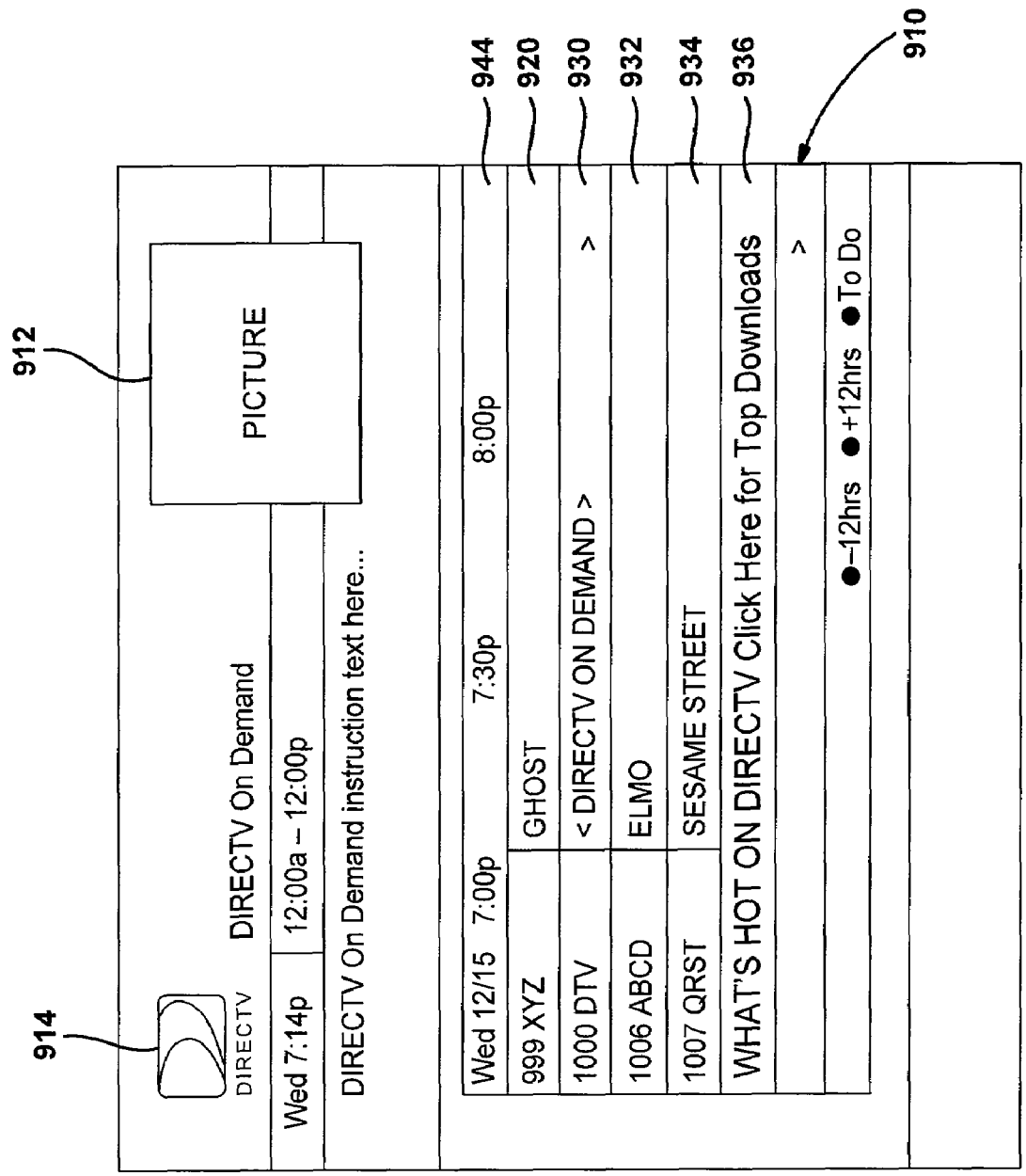
FIG. 9 is yet another schematic view of a screen shot illustrating a row ad placement according to further aspects the present disclosure.

Referring now to FIG. 9, an offset row ad 836 is illustrated. Rows associated with channels 999, 1000, 1006 and 1007 are illustrated at 920, 930, 932 and 934. Row ad 936 may be associated with anchor channel 1000 and offset by three positions. In this example, the offset is down three positions from the anchor channel row. It should be noted that the offset may be above or below a particular channel. The number of positions may also vary. The row ad may be offset may also only be a number of positions without extending below the next channel space. For example, if HBO® has several channels, the top one may be referred to as an anchor channel. The row ad may appear any number of spaces from the anchor row without extending into another brand's row or rows.

FIG. 9 also illustrates that a particular row ad may be tied to a subscription feature. For example, a row ad may be displayed when a particular service is subscribed to. In this example, the subscriber is a subscriber to the DIRECTV® On-Demand service illustrated by Channel 1000. Therefore, the row ad 836 is displayed. Subscribers not subscribing to the DIRECTV® On-Demand service may not see the row ad since the Channel 1000 row will not be displayed.

As mentioned above, various actions may be taken when selecting a row ad. Examples of the selection of a row ad include displaying a Help menu, an Order menu, ordering a particular piece of content or otherwise changing the display. Instructional text or on-screen help may also be displayed. The direct tuning to a linear channel may also be performed when selecting a row ad.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   communicating row ad metadata comprising row ad graphics or text to a user device;
   communicating program guide information to the user device, said program guide information defining a plurality of rows, wherein at least a first row is associated with a first channel wherein the first channel is an anchor channel, and wherein a second row is associated with a row ad, the second row is offset a predetermined number of rows above or below the first channel;
   associating positioning information with the row ad so that the row ad maintains a fixed position relative to the first row;
   populating remaining rows from the plurality of rows in response to the program guide information;
   displaying the first row associated with the anchor channel in a group of rows associated with a first brand and the second row without extending into a second brand row associated with a second brand; and
   in response to the positioning information, positioning the row ad and the first row associated with the first channel within a program guide structure on a display associated with the user device so that the row ad moves with the first row across the display and out of the display without moving into a second brand row.

2. A method as recited in claim 1 wherein the positioning information comprises information for positioning the row ad adjacent to the first row and wherein displaying comprises displaying the row ad adjacent to the first row.

3. A method as recited in claim 2 wherein the row ad and the first row are displayed together when the first row is in view.

4. A method as recited in claim 1 further comprising selecting a numerical channel using a user interface, moving the second row to a top position within the program guide and moving the first row below the second row in response to selecting.

5. A method as recited in claim 4 wherein the numerical channel comprises the first channel.

* * * * *